J. F. RALEIGH.
ENGINE STARTER.
APPLICATION FILED APR. 9, 1913.
1,101,957.
Patented June 30, 1914.
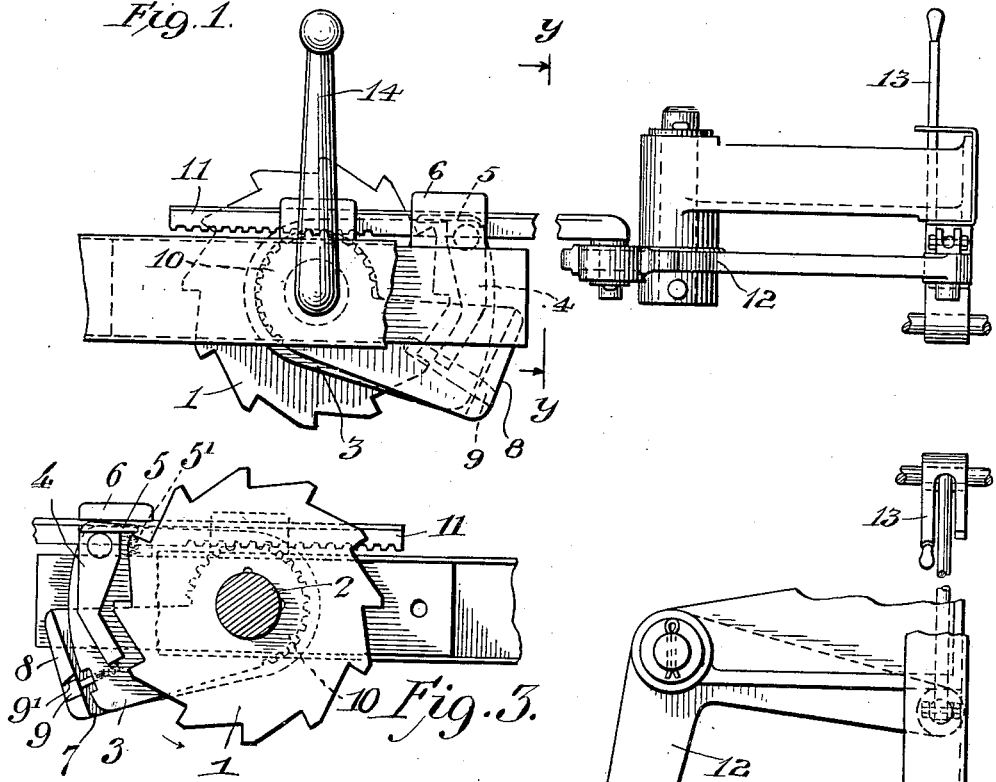
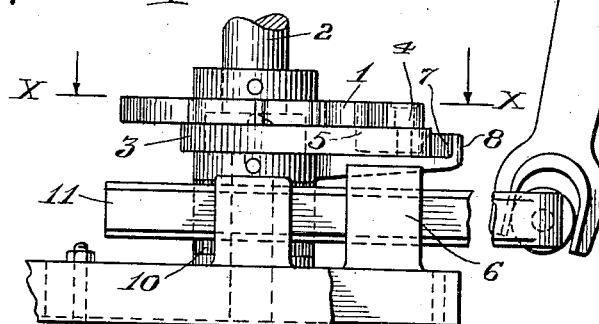
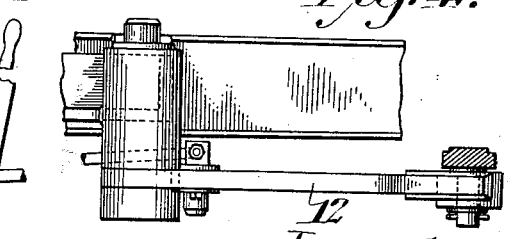
Witnesses:
Henry J. Bull
B. G. Richards
Inventor
James F. Raleigh
By Joshua R. H. Hoss
His Attorney.

UNITED STATES PATENT OFFICE.

JAMES F. RALEIGH, OF CHICAGO, ILLINOIS.

ENGINE-STARTER.

1,101,957.

Specification of Letters Patent.  Patented June 30, 1914.

Application filed April 9, 1913. Serial No. 759,907.

*To all whom it may concern:*

Be it known that I, JAMES F. RALEIGH, a citizen of the United States, and a resident of the city of Chicago, county of Cook, and State of Illinois, have invented certain new and useful Improvements in Engine-Starters, of which the following is a specification.

My invention relates to improvements in engine starters and has for its object the provision of a device of this character which is of simple construction and efficient in operation, and which is arranged to automatically disconnect from the engine shaft upon reversal thereof due to "back-firing," and thus prevent injury to the operator.

The invention consists in the combinations and arrangements of parts hereinafter described and claimed.

The invention will be best understood by reference to the accompanying drawings forming a part of this specification, and in which—

Figure 1 is a front view of a mechanism embodying my invention, Fig. 2, a top plan view of the mechanism shown in Fig. 1, Fig. 3, a section taken on line $x$—$x$ of Fig. 2, and Fig. 4, a view taken on line $y$—$y$ of Fig. 1.

The preferred form of construction as illustrated in the drawings comprises a ratchet wheel 1 which is fixed to the engine shaft 2 in any suitable manner. A pawl arm 3 carries a pawl 4 adapted to engage ratchet wheel 1, said pawl arm being provided with a release arm 5, which is normally pressed outwardly by means of a spring 5' so as to press said pawl normally toward engaging position with said ratchet. Release arm 5 is arranged to engage a stop shoulder 6 suitably attached to the frame of the mechanism so that when the parts are in the positions shown in Fig. 3, said release arm will hold said pawl out of engagement with ratchet wheel 1. Mounted adjacent pawl arm 3 is an operating member 7 which is provided with a flange 8 overhanging the periphery of pawl arm 3 and provided with a notch adapted to receive the head of a spring held pin 9 as shown in Fig. 3, said spring held pin 9 being provided with an inclined surface 9' which engages a similarly inclined side of said notch, said inclination being made such that the connection formed by said pin and notch will hold under normal conditions of use, but in case of a sudden shock due to "back-firing" of the engine, these inclined surfaces will cause the pin to disengage from the notch and thus disconnect operating member 7 from pawl arm 3. Operating member 7 carries a segmental gear 10 which intermeshes with a reciprocatory rack bar 11 connected for operation by a manually operable lever 13 through the medium of a bell crank 12. The mechanism disclosed is especially adapted for use on automobiles and in such application of the construction, the lever 13 is arranged in convenient position for operation by the driver of the automobile. By this arrangement it will be observed that upon actuation of lever 13 rack bar 11 will be moved to cause rotation of operating member 7. Operating member 7 being connected with pawl arm 3 causes operation thereof in the direction of the arrow indicated in Fig. 3. This movement withdraws release arm 5 from shoulder 6 and permits pawl 4 to engage ratchet wheel 1 thus causing rotation of the engine shaft and the consequent starting of the engine as will be readily understood by those skilled in the art. In case of "back-firing" of the engine and consequent reversal of the engine shaft, the sudden shock imposed upon the pin 9 causes surfaces 9' to coöperate to expel said pin from its notch and release the connection between operating member 7 and pawl arm 3, thus preventing injury to the operator. Upon release from operating member 7, pawl arm 3 travels reversely with ratchet wheel 1 and engine shaft 2 until release arm 5 strikes shoulder 6 whereupon said pawl is released from said ratchet and the engine shaft permitted to turn reversely. Upon return of lever 13 to normal position the under surface of flange 8, which is inclined for the purpose, engages pin 9 depressing the same and causing its automatic entry into its notch as will be readily understood. The usual crank 14 is also provided and has the usual releasing connections with the actuation shaft, said construction being old and well known and constituting no part of my invention and needs no further description here.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with an engine shaft, of a ratchet wheel connected to operate said shaft; a pawl arm adjacent said ratchet wheel; a pawl on said arm adapted to engage said ratchet wheel; a rotatable operating member adjacent said pawl arm; a releasable connection between said member and said pawl arm adapted to hold under normal conditions but release under a sudden shock; and manually operable means for actuating said operating member, substantially as described.

2. The combination with an engine shaft, of a ratchet wheel adapted to operate said shaft; a pawl arm adjacent said ratchet wheel; a pawl on said arm adapted to engage said ratchet wheel; a rotatable operating member adjacent said pawl arm; a releasable spring held pin connection between said member and said pawl arm adapted to hold under normal conditions but release under a sudden shock; and manually operable means for actuating said operating member, substantially as described.

3. The combination with an engine shaft, of a ratchet wheel connected to operate said shaft; a pawl arm adjacent said ratchet wheel; a pawl on said arm adapted to engage said ratchet wheel; a rotatable operating member adjacent said pawl arm; a releasable connection between said member and said pawl arm adapted to hold under normal conditions but release under a sudden shock; a gear connected to actuate said operating member; a rack bar intermeshing with said gear; and a lever connected to operate said rack bar, substantially as described.

4. The combination with an engine shaft, of a ratchet wheel adapted to operate said shaft; a pawl arm adjacent said ratchet wheel; a pawl on said arm adapted to engage said ratchet wheel; a rotatable operating member adjacent said pawl arm; a releasable spring held pin connection between said member and said pawl arm adapted to hold under normal conditions but release under a sudden shock; a gear connected to actuate said operating member; a rack bar intermeshing with said gear; and a lever connected to operate said rack bar, substantially as described.

5. The combination with an engine shaft, of a ratchet wheel adapted to operate said shaft; a pawl arm adjacent said ratchet wheel; a pawl on said arm adapted to engage said ratchet wheel; a rotatable operating member adjacent said pawl arm; a releasable spring held pin connection between said member and said pawl arm adapted to hold under normal conditions but release under a sudden shock, said pin being provided with an inclined engaging surface engaging a similarly inclined surface for this purpose; and manually operable means for actuating said operating member, substantially as described.

6. The combination with an engine shaft, of a ratchet wheel adapted to operate said shaft; a pawl arm adjacent said ratchet wheel; a pawl on said arm adapted to engage said ratchet wheel; a rotatable operating member adjacent said pawl arm; a releasable spring held pin connection between said member and said pawl arm adapted to hold under normal conditions but release under a sudden shock, said pin being provided with an inclined engaging surface engaging a similarly inclined surface for this purpose; a gear connected to actuate said operating member; a rack bar intermeshing with said gear; and a lever connected to operate said rack bar, substantially as described.

In testimony whereof I have signed my name to this specification in the presence of two subscribing witnesses.

JAMES F. RALEIGH.

Witnesses:
  JOSHUA R. H. POTTS,
  A. A. OLSON.

---

Copies of this patent may be obtained for five cents each, by addressing the "Commissioner of Patents, Washington, D. C."